US009378857B2

(12) United States Patent
Borsuk et al.

(10) Patent No.: US 9,378,857 B2
(45) Date of Patent: Jun. 28, 2016

(54) LAMP SYSTEMS AND METHODS FOR GENERATING ULTRAVIOLET LIGHT

(75) Inventors: James M. Borsuk, Westlake, OH (US); Greg Harrell, Clyde, OH (US); Edward C. McGhee, Amherst, OH (US); James Smith, Amherst, OH (US)

(73) Assignee: NORDSON CORPORATION, Westlake, OH (US)

( * ) Notice: Subject to any disclaimer, the term of this patent is extended or adjusted under 35 U.S.C. 154(b) by 0 days.

(21) Appl. No.: 13/704,383

(22) PCT Filed: Jul. 15, 2011

(86) PCT No.: PCT/US2011/044169
§ 371 (c)(1),
(2), (4) Date: Dec. 14, 2012

(87) PCT Pub. No.: WO2012/009628
PCT Pub. Date: Jan. 19, 2012

(65) Prior Publication Data
US 2013/0092848 A1 Apr. 18, 2013

Related U.S. Application Data

(60) Provisional application No. 61/365,198, filed on Jul. 16, 2010.

(51) Int. Cl.
*G01J 3/10* (2006.01)
*G21K 5/00* (2006.01)
(Continued)

(52) U.S. Cl.
CPC *G21K 5/00* (2013.01); *B05D 3/061* (2013.01); *F26B 3/28* (2013.01); *G21K 5/08* (2013.01)

(58) Field of Classification Search
CPC .................................. H01J 3/14; H01J 13/248
USPC ....... 250/504 R, 492.1, 505.1, 493.1, 453.11, 250/455.11, 454.11; 315/112, 117; 219/575
See application file for complete search history.

(56) References Cited

U.S. PATENT DOCUMENTS 3,826,014 A * 7/1974 Helding .................... F26B 3/28 219/411
4,208,587 A * 6/1980 Eastlund et al. ........... 250/492.1
(Continued)

FOREIGN PATENT DOCUMENTS

CN 1357415 A 7/2002
CN 101106065 A 1/2008
(Continued)

OTHER PUBLICATIONS

International Preliminary Examining Authority, Transmittal of International Preliminary Report on Patentability issued in related International application No. PCT/US11/44169 dated Aug. 16, 2012.
(Continued)

*Primary Examiner* — Jack Berman
*Assistant Examiner* — Jason McCormack
(74) *Attorney, Agent, or Firm* — Baker & Hostetler LLP

(57) ABSTRACT

Apparatus for generating ultraviolet light and methods of operating an ultraviolet light source. The apparatus may include a microwave chamber (16) enclosing an interior space, a light source (10) with a lamp head (28) coupled to the microwave chamber (16), an ultraviolet (UV) transmissive member (88) positioned above the lamp face (32) and below the interior space to define a plenum (116) therebetween, and an exhaust system (100) coupled in fluid communication with the plenum. The lamp head (28) has a lamp face (32) through which ultraviolet light (34) and cooling air (30) are emitted. The UV transmissive member (88) is configured to transmit the ultraviolet light (34) into the interior space and to divert the cooling air (30) from the interior space. The exhaust system (100) configured to exhaust the cooling air (30) from the plenum (116).

12 Claims, 8 Drawing Sheets

(51) Int. Cl.
*B05D 3/06* (2006.01)
*F26B 3/28* (2006.01)
*G21K 5/08* (2006.01)

(56) References Cited

U.S. PATENT DOCUMENTS

| | | | | |
|---|---|---|---|---|
| 4,563,589 | A * | 1/1986 | Scheffer | 250/504 R |
| 4,839,522 | A * | 6/1989 | Bourgeois et al. | 250/455.11 |
| 6,118,130 | A * | 9/2000 | Barry | 250/504 R |
| 6,646,278 | B1 | 11/2003 | Schwarz et al. | |
| 7,179,046 | B2 * | 2/2007 | Hopkins | 415/61 |
| 7,663,121 | B2 | 2/2010 | Nowak et al. | |
| 7,935,940 | B1 * | 5/2011 | Smargiassi | 250/492.1 |
| 7,964,858 | B2 * | 6/2011 | Yang et al. | 250/504 R |
| 8,410,410 | B2 * | 4/2013 | Bretmersky et al. | 219/757 |
| 2002/0050575 | A1 | 5/2002 | Keogh et al. | |
| 2004/0239256 | A1 * | 12/2004 | Schmitkons | H01J 65/044<br>315/112 |
| 2006/0141806 | A1 * | 6/2006 | Waldfried et al. | 438/778 |
| 2007/0075053 | A1 | 4/2007 | Smith et al. | |
| 2007/0228618 | A1 * | 10/2007 | Kaszuba et al. | 264/494 |
| 2008/0017637 | A1 | 1/2008 | Bretmersky et al. | |
| 2009/0289552 | A1 | 11/2009 | Borsuk et al. | |
| 2010/0084574 | A1 | 4/2010 | Brassell et al. | |
| 2010/0096564 | A1 | 4/2010 | Yang et al. | |
| 2011/0108741 | A1 * | 5/2011 | Ingram | 250/492.1 |
| 2011/0277338 | A1 * | 11/2011 | Li | F26B 3/28<br>34/275 |

FOREIGN PATENT DOCUMENTS

| | | | |
|---|---|---|---|
| JP | S57-200662 | U | 12/1982 |
| JP | H06-144881 | A | 5/1994 |
| JP | 2009289527 | A | 12/2009 |
| WO | 00/61999 | A1 | 10/2000 |
| WO | WO 2010055446 | A1 * | 5/2010 |

OTHER PUBLICATIONS

International Searching Authority, Notification of Transmittal of the International Search Report and Written Opinion of the International Searching Authority issued in related International Application No. PCT/US11/44169 dated Nov. 17, 2011.
The State Intellectual Property Office of the People's Republic of China, First Office Action received in Application No. 201180035026.4 dated Jan. 7, 2015.
Japan Patent Office, Official Action issued in Patent Application No. 2013-520758 dated Mar. 18, 2015.

* cited by examiner

LAMP SYSTEMS AND METHODS FOR GENERATING ULTRAVIOLET LIGHT

FIELD OF THE INVENTION

The present invention relates generally to an apparatus and a method for ultraviolet light and, more specifically, to lamp systems and methods for treating or curing materials on a substrate or product by application of ultraviolet light.

BACKGROUND OF THE INVENTION

Ultraviolet lamp systems, such as those used in the heating or curing of adhesives, sealants, inks or other coatings for example, are designed for coupling microwave energy to an electrodeless lamp, such as an ultraviolet (UV) plasma lamp bulb mounted within a microwave chamber of the lamp system. In ultraviolet lamp heating and curing applications, one or more magnetrons are typically provided in the lamp system to couple microwave radiation to the plasma lamp bulb within the microwave chamber. The magnetrons are coupled to the microwave chamber through waveguides that include output ports connected to an upper end of the chamber. When the plasma lamp bulb is sufficiently excited by the microwave energy, it emits ultraviolet radiation in one direction through an open lamp face of the lamp system to irradiate a substrate which is located generally near the open lamp face.

A source of pressurized air is fluidly connected to a housing of the lamp system which contains the magnetrons, the microwave chamber and the plasma lamp bulb. The source of pressurized air is operable to direct cooling air, such as 350 CFM of cooling air for example, through the housing and into the microwave chamber to properly cool the magnetrons and the plasma lamp bulb during irradiation of the substrate by the lamp system.

In some UV heating and curing applications, the lamp system includes a mesh screen mounted at the open lamp face which is transmissive to ultraviolet radiation but is opaque to microwaves. The configuration of the mesh screen also permits the significant air flow of cooling air to pass therethrough and toward the substrate.

In some applications, however, the substrate may require a clean environment, such as in a curing chamber, so that the substrate will not be contaminated during the heating and curing process by contaminants carried by the cooling air in contact with the substrate. Moreover, the substrate may also be somewhat delicate and therefore susceptible to damage in harsh environments, such as under the influence of the significant air flow of the cooling air which impinges upon and possibly disturbs the substrate. Oftentimes, the substrate may also be adversely affected by excessive heat which may be generated by the plasma lamp bulb during the irradiation process. Still further, the substrate may configured about the perimeter of a material, thus requiring multiple and different application of UV light to irradiate the substrate around the product.

SUMMARY OF THE INVENTION

Embodiments of the present invention address these and other problems associated with the prior art by providing apparatus for generating ultraviolet light and methods for operating an ultraviolet light source.

In one embodiment, the apparatus comprises a chamber enclosing an interior space, a light source including a lamp head coupled to the chamber, and an ultraviolet (UV) transmissive member. The lamp head includes a lamp face configured to transmit the ultraviolet light and cooling air provided to the apparatus. The ultraviolet (UV) transmissive member is positioned above the lamp face and below the interior space to define a plenum therebetween. The UV transmissive member is configured to transmit the ultraviolet light into the interior space and to divert the cooling air from entering the interior space. An exhaust system, which is coupled in fluid communication with the plenum, is configured to exhaust the cooling air from the plenum.

In another embodiment, the method comprises emitting ultraviolet light from the lamp head, cooling the lamp head with cooling air, transmitting the ultraviolet light through a UV transmissive member in to an interior space of a chamber, and diverting the cooling air away from the interior space of the chamber.

These and other advantages will be apparent in light of the following figures and detailed description.

BRIEF DESCRIPTION OF THE DRAWINGS

The accompanying drawings, which are incorporated in and constitute a part of this specification, illustrate embodiments of the invention and, together with a general description of the invention given above and the detailed description of the embodiments given below, serve to explain the principles of the invention.

It should be understood that the appended drawings are not necessarily to scale, presenting a somewhat simplified representation of various features illustrative of the basic principles of embodiments of the invention. The specific design features of embodiments of the invention as disclosed herein, including, for example, specific dimensions, orientations, locations, and shapes of various illustrated components, as well as specific sequences of operations (e.g., including concurrent and/or sequential operations), will be determined in part by the particular intended application and use environment. Certain features of the illustrated embodiments may have been enlarged or distorted relative to others to facilitate visualization and clear understanding.

DETAILED DESCRIPTION

Figure 1:
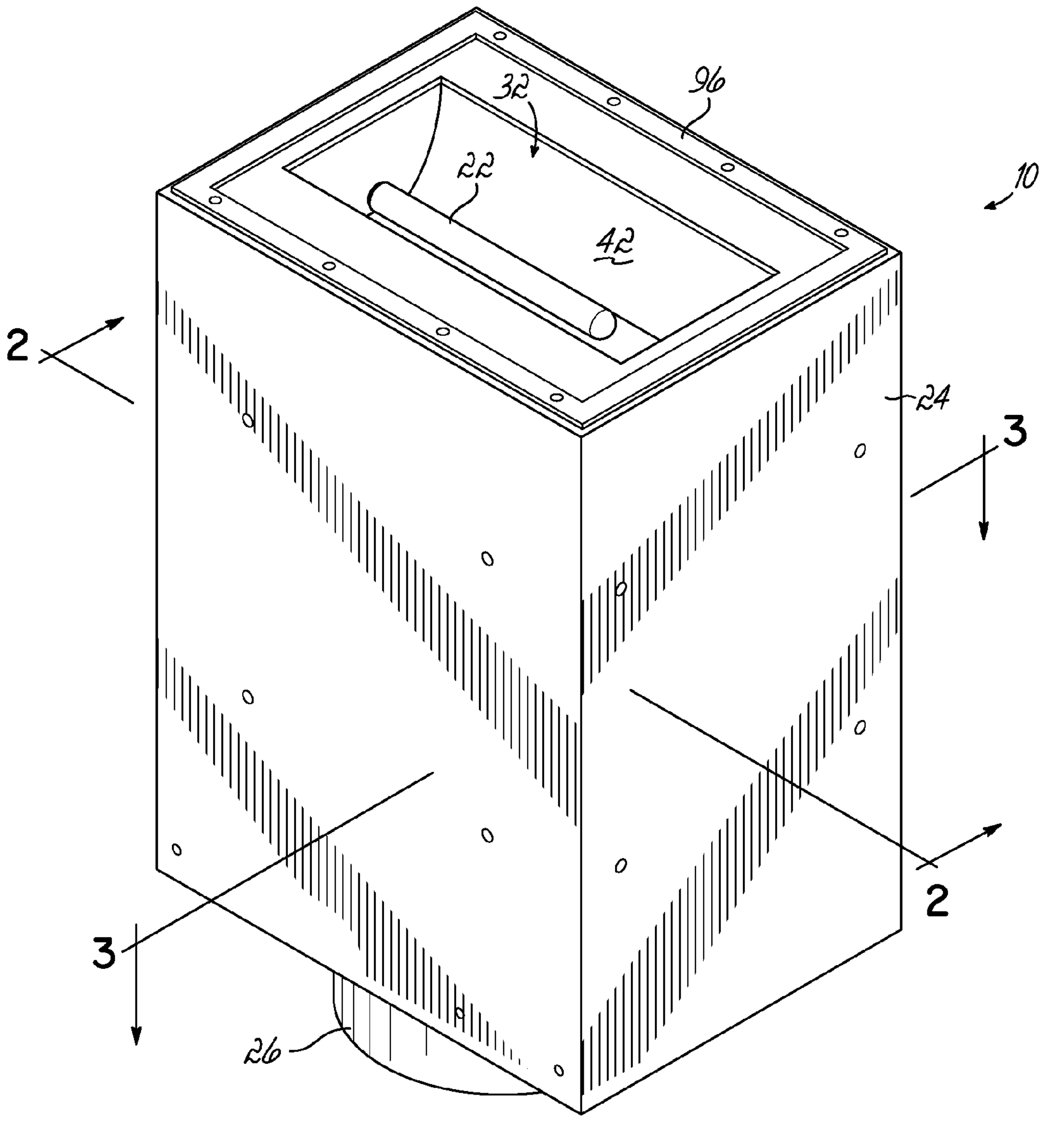
FIG. 1 is a perspective view of a microwave excited ultraviolet light source consistent with embodiments of the invention.
Figure 2:
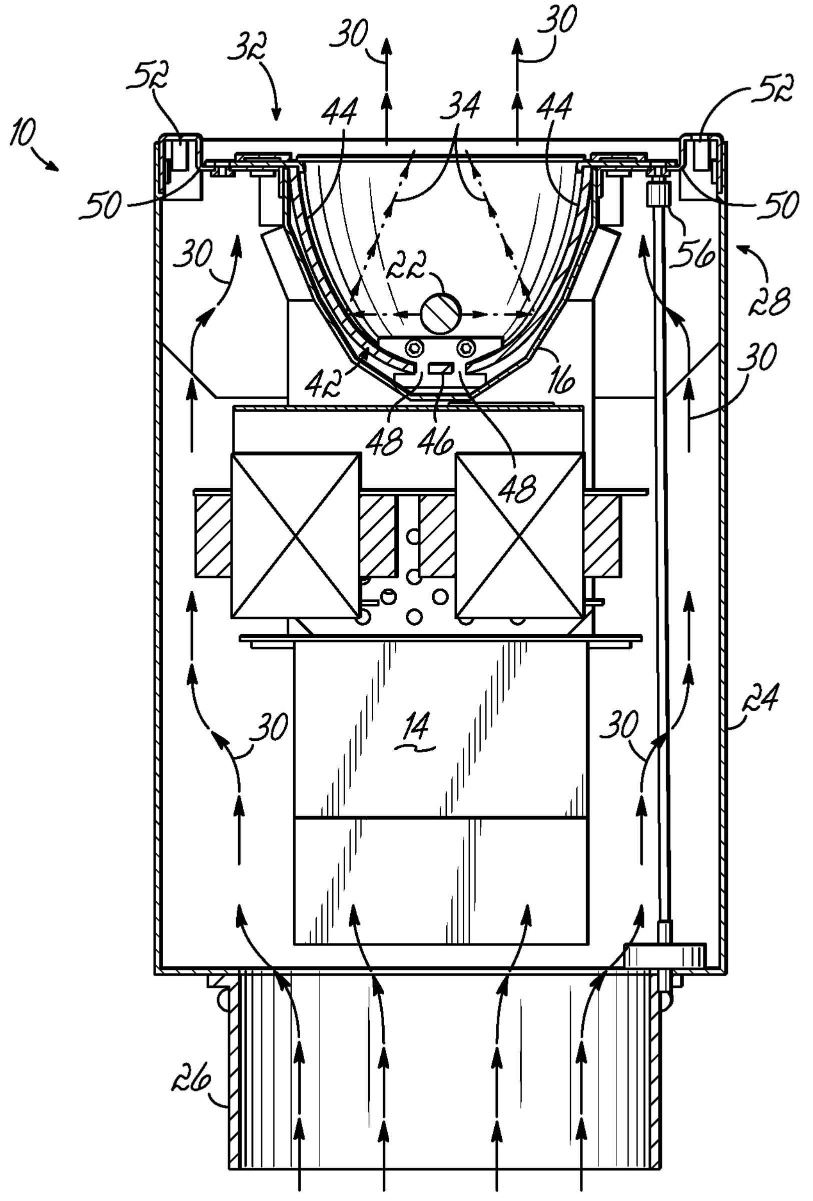
FIG. 2 is a cross-sectional view of the light source of FIG. 1 taken along line 2-2.
Figure 3:
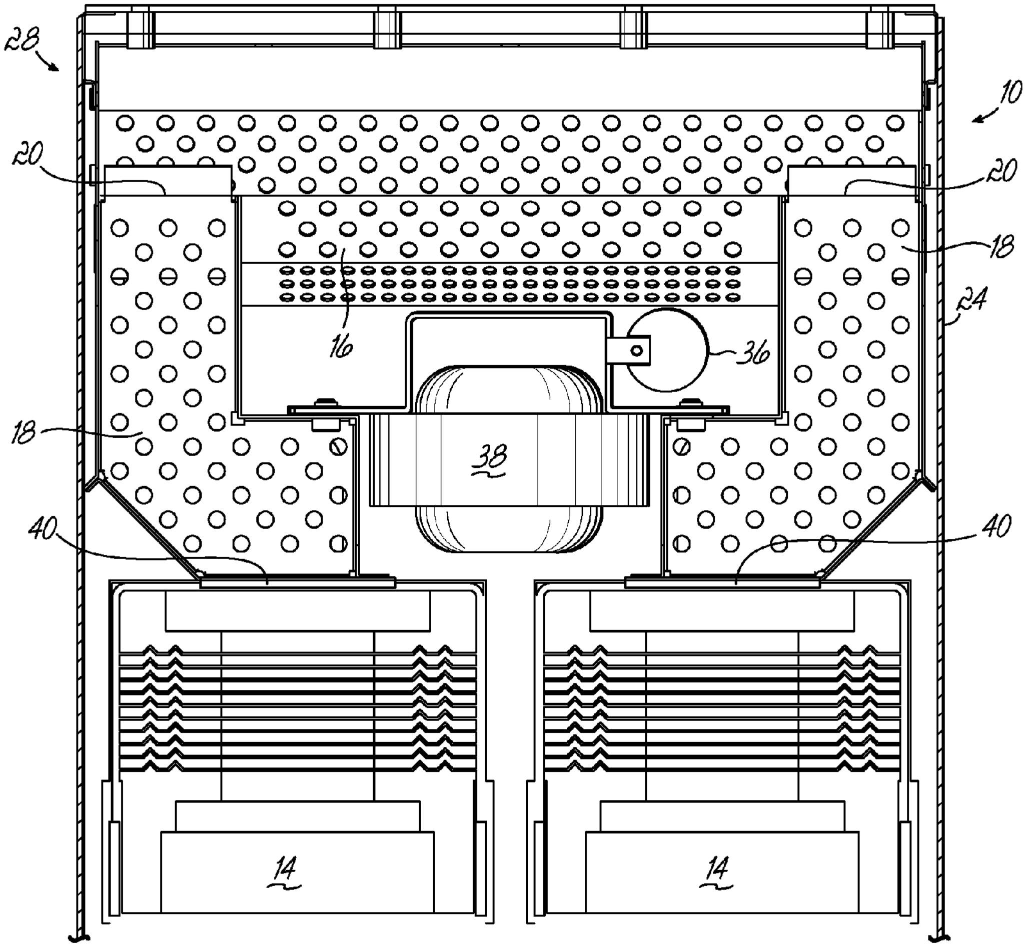
FIG. 3 is a cross-sectional view of the light source of FIG. 1 taken along line 3-3.

Turning now to the drawings, wherein like numbers denote like parts throughout the several views, FIGS. 1-3 show a microwave-excited UV lamp system or light source 10 consistent with embodiments of the invention. Light source 10 includes a pair of microwave generators, illustrated as a pair of magnetrons 14, that are each coupled to a longitudinally extending microwave chamber 16 through a respective waveguide 18.

Each waveguide 18 has an outlet port 20 coupled to a lower end of the microwave chamber 16 so that microwave energy generated by the pair of microwave generators 14 are coupled to the microwave chamber 16 in spaced longitudinal relationship adjacent opposite lower ends of the microwave chamber 16. An electrodeless plasma lamp 22, in the form of a sealed, longitudinally extending plasma lamp bulb, is mounted within the microwave chamber 16 and supported adjacent the upper end of the microwave chamber 16 as is well known in the art.

The light source 10 includes a housing 24 which is connected in fluid communication with a source of pressurized air (not shown in FIGS. 1-3) in one embodiment through an air inlet duct 26 as is well known in the art. The air inlet duct 26 is located at a lower end of the housing 24 and the upper end of the housing 24 forms a lamp head 28. The source of pressurized air is operable to direct a flow of cooling air, represented diagrammatically by arrows 30 in FIGS. 1 and 2, through the housing 24 and into the microwave chamber 16 to cool the magnetrons 14 and plasma lamp bulb 22 as will be described in greater detail below. The flow of cooling air 30 passes through the microwave chamber 16 and is emitted or transmitted through openings in an open lamp face 32 of the lamp head 28.

Light source 10 is designed and constructed to emit ultraviolet light, illustrated diagrammatically by arrows 34 in FIG. 2, through the open lamp face 32 of the light source 10 upon sufficient excitation of the plasma lamp bulb 22 by microwave energy coupled to the microwave chamber 16 from the pair of microwave generators 14. While a pair of magnetrons 14 are illustrated and described herein, it is to be understood that the light source 10 may include only a single magnetron 14 to excite the plasma lamp bulb 22 consistent with embodiments of the invention.

As shown in FIG. 3, light source 10 includes a starter bulb 36 and a pair of transformers 38 (one shown) that are each electrically coupled to a respective one of the magnetrons 14 to energize filaments of the magnetrons 14 as understood by those skilled in the art. The magnetrons 14 are mounted to inlet ports 40 of the waveguides 18 so that microwaves generated by the magnetrons 14 are discharged into the microwave chamber 16 through the longitudinally spaced apart outlet ports 20 of the waveguides 18. Preferably, the frequencies of the two magnetrons 14 are split or offset by a small amount to prevent intercoupling between them during operation of the light source 10. In specific embodiments, a first magnetron 14 may produce a signal of about 2.4 GHz, while a second magnetron 14 produces a signal that has a difference up to about 20 MHz from the first magnetron 14.

A longitudinally extending lamp reflector 42 is mounted within the microwave chamber 16 for reflecting the ultraviolet light 34 emitted from the plasma lamp bulb 22 toward a substrate (not shown) which is located outside the open lamp face 32 of the lamp head 28. The lamp reflector 42 may have an elliptical configuration in transverse cross-section, although parabolic or other cross-sectional configurations are possible without departing from the spirit and scope of the present invention. Alternatively, the lamp reflector 42 may be configured as a flood reflector as is known in the art (as opposed to a focus reflector, also known in the art). Ultraviolet light, as used herein, is radiation having a wavelength (or frequency) within the ultraviolet band of the electromagnetic spectrum.

The lamp reflector 42 is made of coated glass. For example, one side of the lamp reflector 42 (e.g., the plasma lamp bulb side) includes a dichroic coating while the other side of the lamp reflector 42 may be sandblasted. Thus, the lamp reflector 42 is substantially transparent to the microwave energy generated by the pair of magnetrons 12 but substantially opaque to, and substantially reflective of, the ultraviolet light 34 emitted by the plasma lamp bulb 22. Alternatively, the lamp reflector 42 may be made of another material having suitable reflective, refractive, and/or thermal properties, such as polished aluminum, which is also substantially transparent to the microwave energy generated by a magnetron 14 but substantially opaque to, and substantially reflective of, the ultraviolet light 34 emitted by the plasma lamp bulb 22.

As shown in FIG. 2, lamp reflector 42 includes a pair of longitudinally extending reflector panels 44 that are mounted in opposing, i.e., mirror facing relationship within the microwave chamber 16 and in spaced relationship to the plasma lamp bulb 22. Each reflector panel 44 is preferably made of coated glass, although other materials having suitable reflective and thermal properties are possible as well. When made of coated glass, for example, each reflector panel 44 is transparent to the microwave energy generated by the pair of magnetrons 14 but opaque to and reflective of the ultraviolet light 34 emitted by the plasma lamp bulb 22.

Further referring to FIG. 2, a longitudinally extending intermediate member 46 is mounted within the microwave chamber 16 in spaced relationship to the reflector panels 44, and also in spaced relationship to the plasma lamp bulb 22. The intermediate member 46 may be made of glass, such as PYREX®, and may be uncoated to be non-reflective of the ultraviolet light 34 emitted by the plasma lamp bulb 22.

When the pair of reflector panels 44 and the intermediate member 46 are mounted within the microwave chamber 16 to form the lamp reflector 42, a pair of spaced, longitudinally extending slots 48 are formed between the reflector panels 44 and the intermediate member 46. The pair of spaced, longitudinally extending slots 48 are operable to pass cooling air 30 from the pressurized air source toward the plasma lamp bulb 22 so that the cooling air 30 substantially envelops the outer surface of the plasma lamp bulb 22 to cool the bulb 22. Details of the construction of the lamp reflector 42 are fully described in commonly owned and co-pending U.S. Pat. No. 6,696,801, entitled "Microwave Excited Ultraviolet Lamp System With Improved Cooling," the disclosure of which is hereby incorporated by reference herein in its entirety. Alternatively, other reflector configurations are possible as well as will be readily understood by those of ordinary skill in the art. The cooling air 30 passes through the microwave chamber 16 and is emitted through the open lamp face 32 of the lamp head 28. As illustrated in FIGS. 2 and 3, the light source 10 is further configured with mounting flanges 50 having threaded apertures 52 that may be utilized to mount a curing chamber and/or exhaust system to the light source 10.

With respect to the cooling air 30, a sufficient flow rate, such as about 350 CFM for example, is provided within the housing 24 to insure proper operation of the magnetrons 14 and the plasma lamp bulb 22. To insure that a sufficient cooling air flow rate is being provided during operation of the light source 10, a differential pressure transducer 56 is mounted in fluid communication with the lamp head 28 and the housing 24. The differential pressure transducer 56 senses the pressure drop in the housing 24 and provides a signal to a controller of the light source 10 (not shown) to shut down the light source 10, adjust the flow of energy to the magnetrons 14 (thereby adjusting the intensity of the UV light from the plasma lamp bulb 22), and/or adjust the flow of air in the light source 10 when the desired pressure is not sensed.

Figure 4:
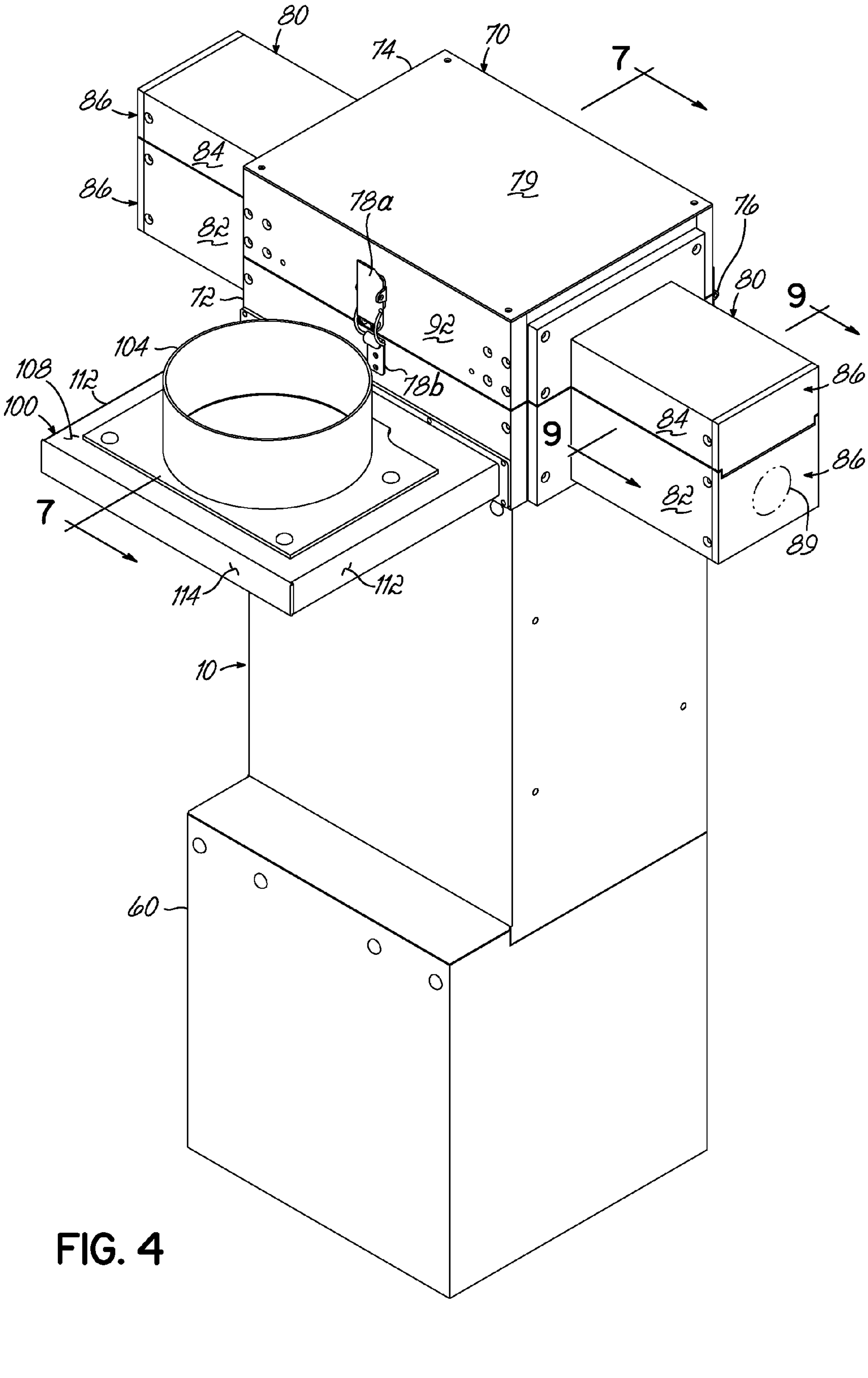
FIG. 4 is a perspective view of a lamp system that includes the light source of FIG. 1 along with a pressurized air source, curing chamber, and exhaust system.
Figure 5:
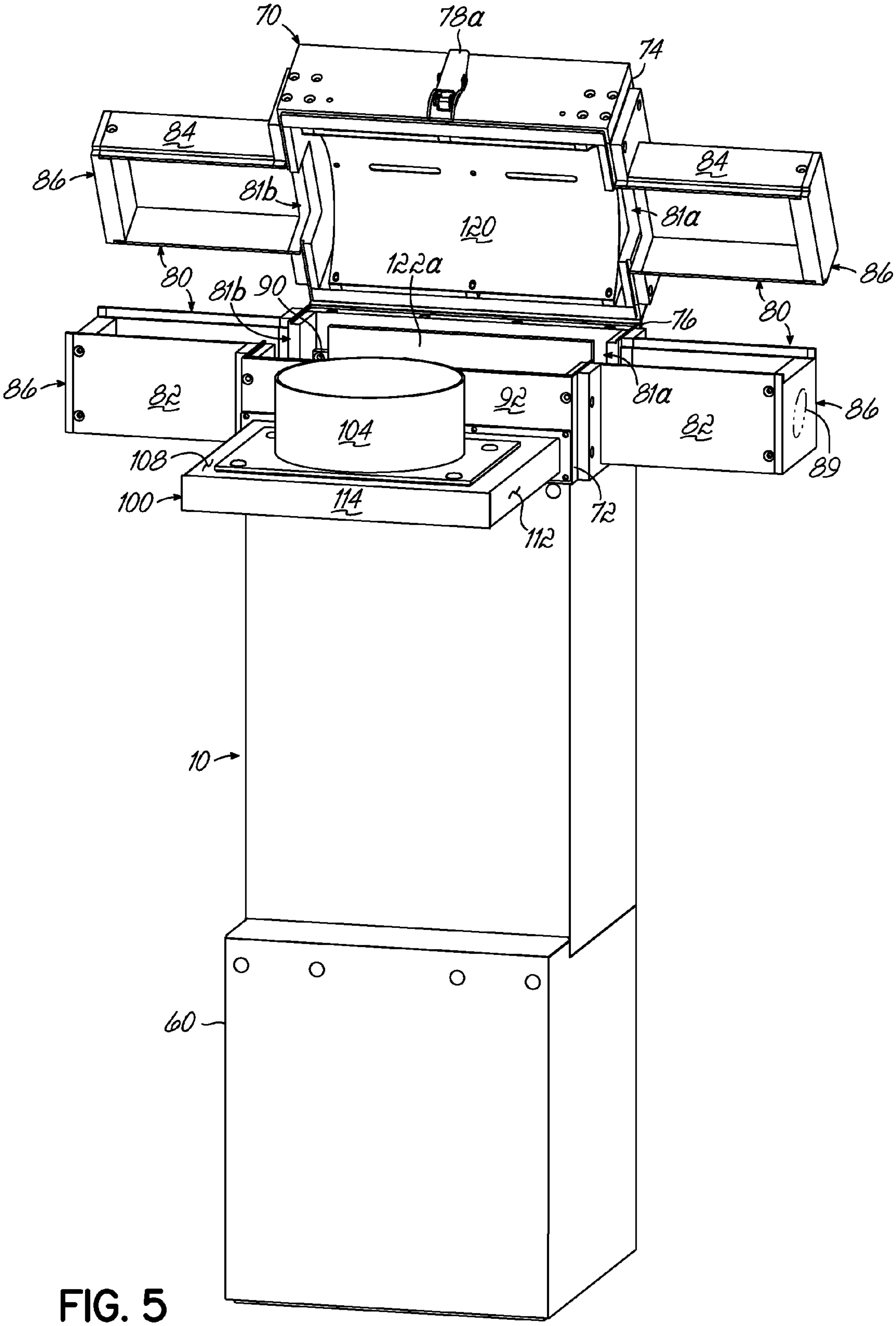
FIG. 5 is a perspective view of the lamp system of FIG. 4 that illustrates internal components of the curing chamber.

With reference to FIGS. 4-5, a lamp system includes a source for pressurized air 60 and/or a curing chamber 70 are mounted to the light source 10. The pressurized air source 60 may collect ambient air, filter that air, and cool the air. The pressurized air source 60 may then provide that collected, filtered, and cooled air as cooling air 30 to the light source 10 through the air inlet duct 26. The curing chamber 70, in conjunction with the light source 10, is configured to provide UV light to substantially all of the perimeter of a substrate (not shown) as well as isolate the substrate from the cooling air 30 emitted through the open lamp face 32 of the lamp head 28.

Referring to FIGS. 4-9, the curing chamber 70 is secured to the light source 10 utilizing a plurality of threaded bolts 71 that are threadingly engaged with respective apertures 52 of the mounting flanges 50. The curing chamber 70 includes an interior space that is at least partially defined by a lower housing 72 and an upper housing 74 connected by a hinge 76. The lower housing 72 is secured to the upper housing 72 by a latch assembly 78 (e.g., a latch 78*a* on the upper housing 74 that is secured by a securing mechanism 78*b* on the lower housing 72) when closed, but secured to the light source 10 via the aforementioned threaded bolts 71. The curing chamber 70 includes a top panel 79 but does not include a bottom panel. Rather, the bottom of the curing chamber 70 is open to the cooling air 30 and ultraviolet light 34 emitted by the light source 10.

Two light shrouds 80 are configured on the sides of the curing chamber 70. Specifically, the interiors of the light shrouds 80 are in fluid communication with the interior space of the curing chamber 70 through an inlet 81*a* and an outlet 81*b*, although the inlet 81*a* and outlet 81*b* may be swapped. The light shrouds 80 are configured to prevent substantial amounts of UV light from escaping the curing chamber 70.

Each light shroud 80 also includes a lower shroud housing 82 and an upper shroud housing 84 as well as respective end caps 86 (e.g., end cap 86*a* on the upper shroud housing 84 and end cap 86*b* on the lower shroud housing 82). The end caps 86 may be removed to allow a substrate (e.g., an object such as a rope, bar, or pipe) carrying the UV curable material with to be introduced or fed into one light shroud 80, through the curing chamber 70, and out another light shroud 80. Alternatively, the end caps 86 may be machined to include an aperture 89 extending through the ends caps 86 that is substantially similar to the cross-section of the substrate (e.g., the aperture may have a similar cross-section corresponding to the aforementioned rope, bar, or pipe) such that the substrate and UV curable material can be introduced or fed through one light shroud 80, through the curing chamber 70, and out another light shroud 80. As illustrated throughout the figures, each light shroud 80 is substantially hollow such that a guide mechanism (not shown) may be positioned in the bottom of the light shroud to support and/or guide a product through the curing chamber 70.

Figure 6:
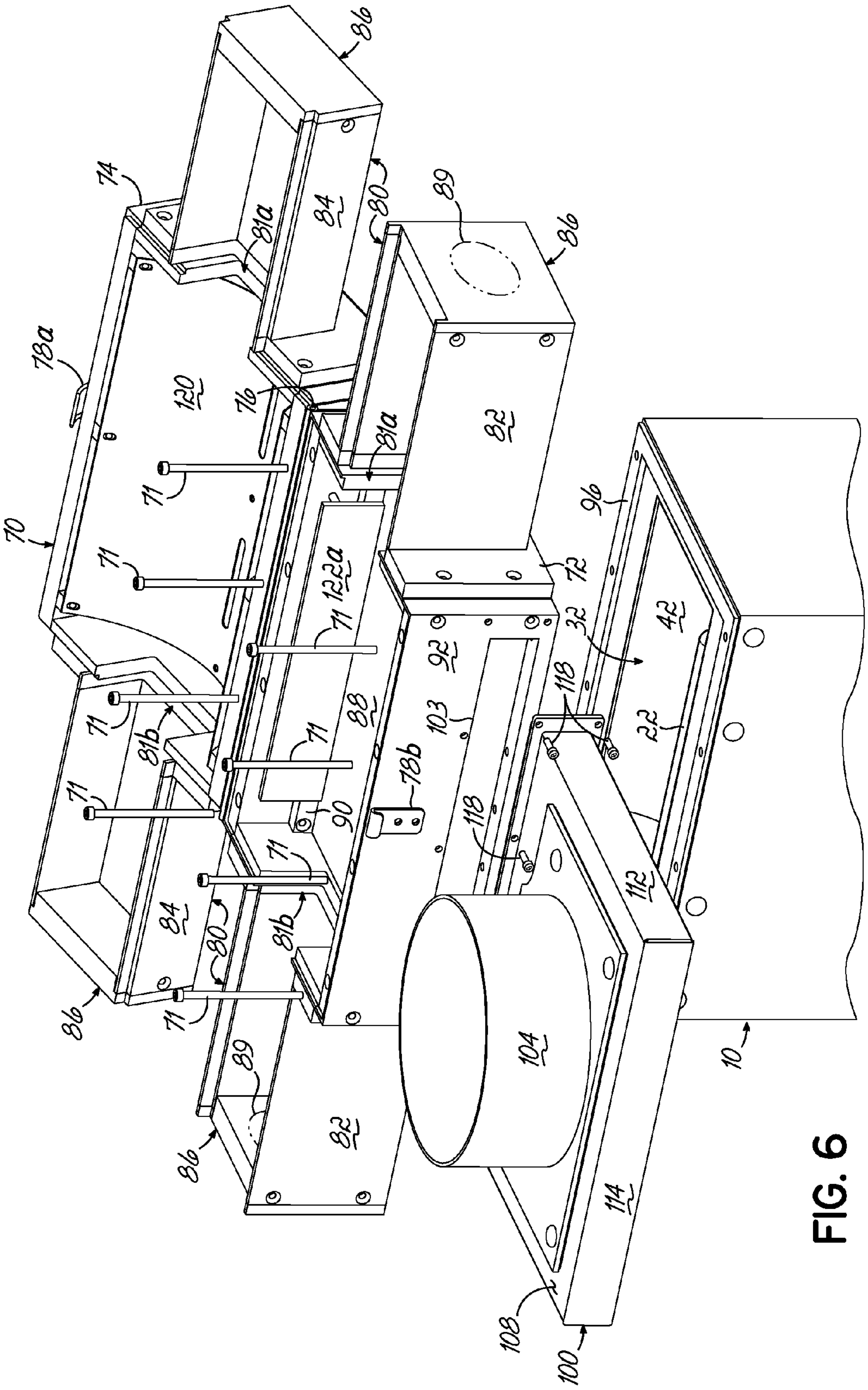
FIG. 6 is a partially exploded view of a portion of the lamp system of FIG. 4 that illustrates internal components of the curing chamber and the connection of the curing chamber to the light source and exhaust system.
Figure 7:
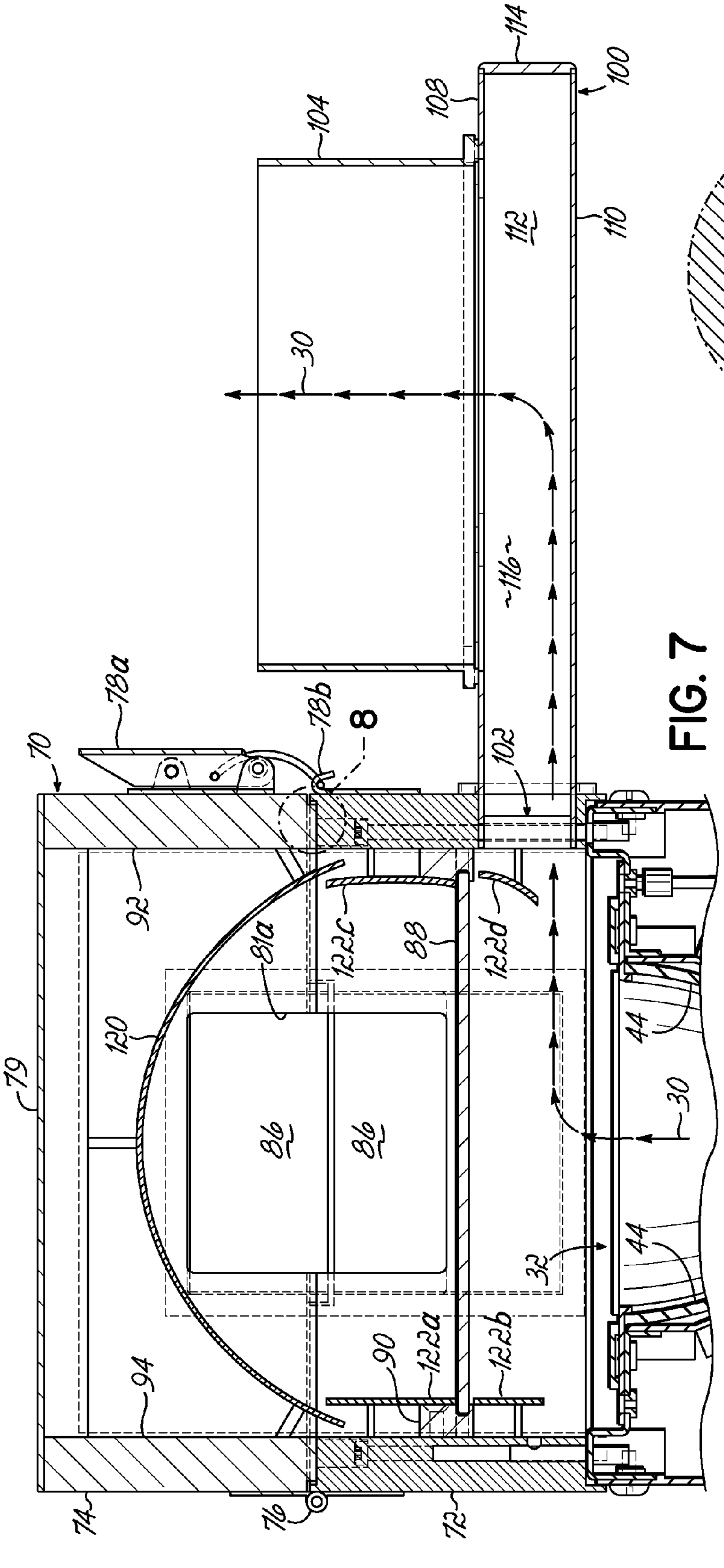
FIG. 7 is a cross-sectional view of a portion of the light source, curing chamber, and exhaust system of FIG. 4 taken along line 7-7.

As best shown in FIGS. 6 and 7, the curing chamber 70 includes an ultraviolet light (UV) transmissive member 88 held in place by a mounting bracket 90. The UV transmissive member 88 may be comprised of quartz. The mounting bracket 90, in turn, is secured to the front wall 92 and the back wall 94 of the curing chamber 70. The front wall 92 is not directly connected to the back wall 94, but is instead indirectly connected with the back wall 94. A curing chamber reflector 120 is positioned between the front wall 92 and the back wall 94.

A generally air-tight seal is formed between the UV transmissive member 88 and the walls of the curing chamber 70. Such an air-tight seal ensures that the interior of the curing chamber 70 that is in fluid communication with the light shrouds 80, and therefore the interior of the curing chamber 70 in which the substrate is located, does not receive any cooling air 30 emitted from open lamp face 32 of the lamp head 28. A sealant or other gasket (not shown) may be in communication with the edges of the UV transmissive member 88, or the UV transmissive member 88 and the mounting bracket 90 or other walls of the curing chamber 70, to form the generally air-tight seal. At least one rubber gasket 96 may also be positioned between the light source 10 and the curing chamber 70 to create a generally air-tight seal therebetween. In some embodiments, the UV transmissive member 88 is a substantially rectangular member with a substantially flat cross-section and a perimeter that generally corresponds to the top-view cross section of the curing chamber 70 without substantially causing convergence or divergence of the ultraviolet light 34 transmitted therethrough. In alternative embodiments, the UV transmissive member 88 may have a cross section such that the ultraviolet light 34 transmitted through the UV transmissive member 88 is diverged or converged.

An exhaust system 100 is in fluid communication with the open lamp face 32 of the lamp head 28. Specifically, the exhaust system 100 is configured with an air inlet port 102 to receive the cooling air 30 emitted through the open lamp face 32 into a plenum formed by the walls of the curing chamber 70 and the UV transmissive member 88. The exhaust system 100 receives the cooling air 30 through a hole 103 extending through the front wall 92 of the curing chamber 70 that is positioned below the UV transmissive member 88. An exhaust duct 104 is configured to direct the cooling air 30 to a location remote from the lamp head 28 so that the cooling air 30 does not contact the substrate.

In one embodiment, the exhaust system 100 is an exhaust duct that in turn includes a top wall 108, an opposite bottom wall 110, a pair of opposite side walls 112 and an end wall 114 which are configured to form an elongated and enclosed plenum 116. The enclosed plenum 116 is in fluid communication with the open lamp face 32 of the lamp head 28. The exhaust system 100 is attached to the front wall 92 of the curing chamber 70 through at least one screw 118.

The curing chamber 70 is further configured with at least one curing chamber reflector 120 configured on interior of the upper housing 74 as well as at least one side reflector 122. In some embodiments, at least one side reflector 122 is configured on each of the front wall 92 and back wall 94. In specific embodiments, and as illustrated in FIG. 6, two side reflectors 122 are configured on each of the front wall 92 and back wall 94: one side reflector 122*a* above the UV transmissive member 88 attached to the back wall 94, one side reflector 122*b* below the UV transmissive member 88 attached to the back wall 94, one side reflector 122*c* above the UV transmissive member 88 attached to the front wall 92, and one side reflector 122*d* below the UV transmissive member 88 attached to the front wall 92. Curing chamber reflector 120 and side reflectors 122*a-d* may have an elliptical configuration in transverse cross-section (e.g., as illustrated with side reflectors 122*c* and 122*d*), although parabolic or other cross-sectional configurations are possible without departing from embodiments of the invention. Specifically, and as illustrated in FIGS. 4-6, side reflectors 122*a* and 122*b* include a flat cross-section and the side reflectors 122*c* and 122*d* have a curvature and are not flat so that the side reflectors 122*a-d* have different cross-sectional profiles. Thus, utilizing the curing chamber reflector 120 and the side reflectors 122, the curing chamber 70 may be configured to provide ultraviolet light 34 to substrate positioned around the perimeter of a product.

Figure 8:
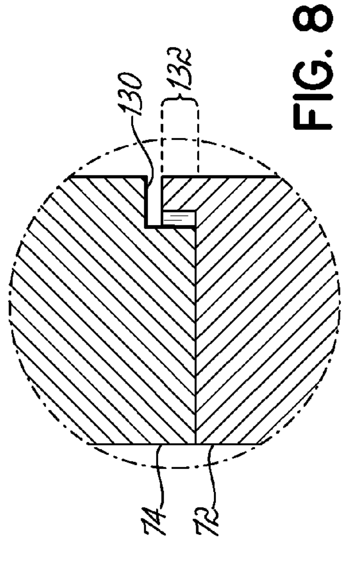
FIG. 8 is a partial cross-sectional view of the detail of the connection between the upper and lower housing of the curing chamber of FIG. 7 taken along view 8.
Figure 9:
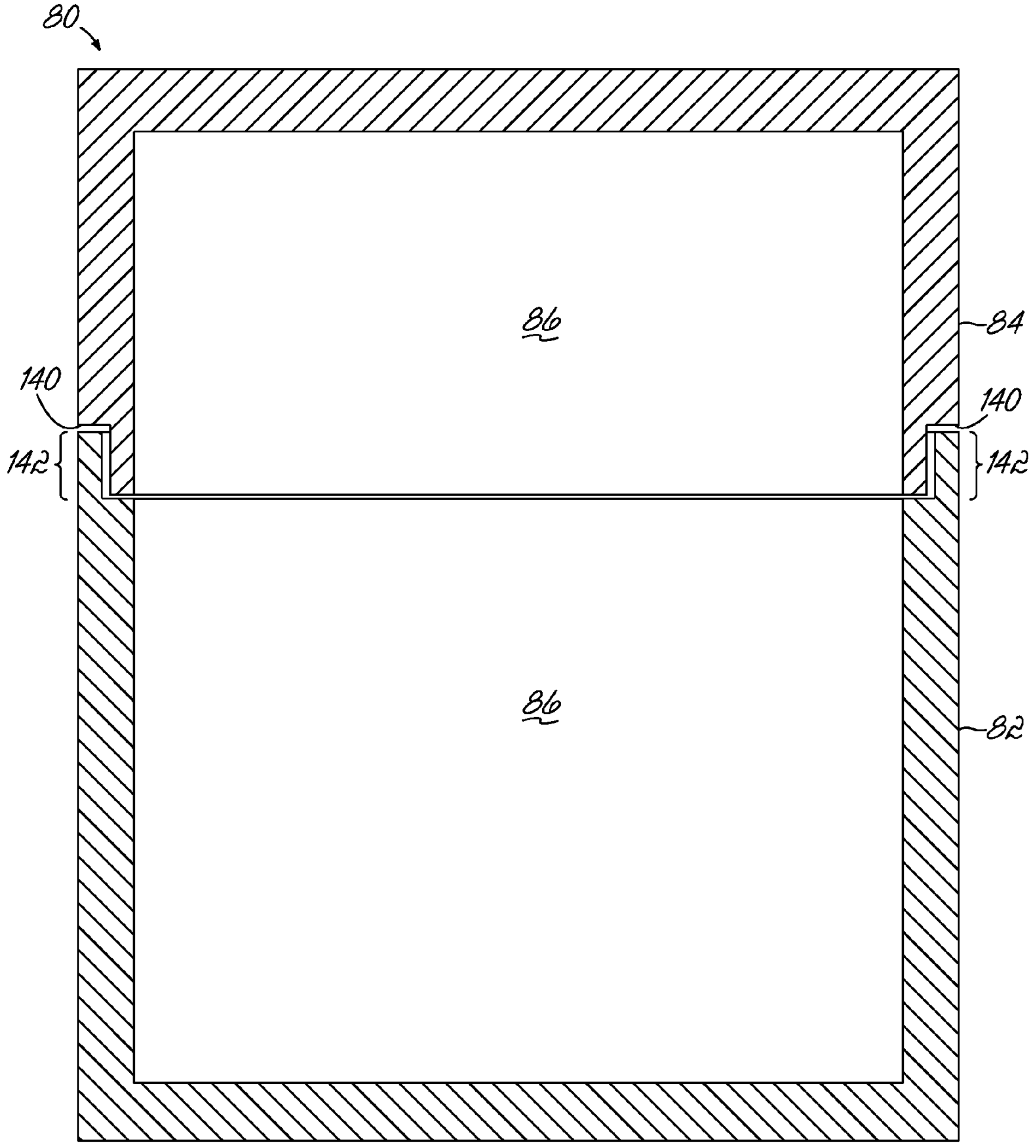
FIG. 9 is a cross-sectional view of a light shroud of the curing chamber of FIG. 4 taken along line 9-9.

At least a portion of the lower housing 72 is configured to overlap the upper housing 74. Specifically, as illustrated in FIG. 8, at least a portion of the front wall 92 of the upper housing 74 is removed as at 130 while the lower housing 72 includes an upwardly directed projection 132 that overlaps the removed portion 130. Similarly, as illustrated in FIG. 9, the portion of a light shroud 80 connected to the upper housing 74 is also removed as at 140 while the portion of the light shroud 80 connected to the lower housing 72 also includes an upwardly directed projection 142 that overlaps the removed portion 140. As such, ultraviolet light that may escape from the connection between the lower housing 72 and upper housing 74, as well as light that may escape from the connection where the two halves of the light shrouds 80 meet, is prevented.

Thus, embodiments of the invention provide a lamp system that includes a curing chamber 70 attachment for providing an enhanced dual cure. Specifically, the curing chamber 70 is operable to provide a full product cure (sometimes referred to as a "3-Dimensional" or "360° cure"). The curing chamber 70 can also be configured to maximize the intensity of ultraviolet light on the substrate geometry by adjusting the angles of the side reflectors 122 and thus the ultraviolet light reflected onto the substrate. Thus, the use of multiple plasma lamp bulbs 22, multiple lamp heads 28, and/or multiple and different applications of ultraviolet light for a substrate are prevented. Additionally, the curing chamber 70 provides an interior space that is warmed to about 300° F. during operation, and thus not only provides a full product ultraviolet light cure but also provides a thermal cure for an enhanced dual cure.

With respect to the curing chamber 70, the overlapping design of the edges of the lower housing 72 and the upper housing 74, as well as the overlapping design of the edges of the light shrouds 80, prevents substantial ultraviolet light loss and transmission to the operating environment. The enhanced dual cure is also provided without contaminating the substrate and/or the product (e.g., a UV curable material) while also providing a stable platform for the product. Specifically, the cooling air 30 from the light source 10 does not contaminate the substrate or product, nor does the cooling air 30 impart unwanted motion to the substrate or product on the substrate. The product, in turn, can be supported by the previously discussed guide mechanisms in the respective light shrouds 80.

A person having ordinary skill in the art will recognize that the environments illustrated in FIGS. 1-9 are not intended to limit the scope of embodiments of the invention. In particular, the light source may include fewer or additional components consistent with alternative embodiments of the invention. Indeed, a person having skill in the art will recognize that other alternative hardware environments may be used without departing from the scope of the invention. For example, a person having ordinary skill in the art will appreciate that the light source 10 may be coupled with an actuable shutter assembly (not shown) to ensure that as little ultraviolet light 34 escapes from the light source 10 as possible when that actuable shutter assembly is closed. Such a shutter assembly is disclosed in U.S. Pat. No. 6,933,683 entitled "Microwave Powered Lamphead Having External Shutter," the disclosure of which is incorporated by reference herein in its entirety.

Furthermore, while embodiments of the invention has been illustrated by a description of the various embodiments and the examples, and while these embodiments have been described in considerable detail, it is not the intention of the applicants to restrict or in any way limit the scope of the appended claims to such detail. Additional advantages and modifications will readily appear to those skilled in the art. Thus, the invention in its broader aspects is therefore not limited to the specific details, apparatuses, and/or methods shown and described. Accordingly, departures may be made from such details without departing from the spirit or scope of applicants' general inventive concept.

What is claimed is:

1. An apparatus for generating ultraviolet light, the apparatus provided with a flow of cooling air, the apparatus comprising:

a chamber enclosing an interior space;

a light source including a lamp head coupled to said chamber, said lamp head including a lamp bulb configured to emit the ultraviolet light, a lamp face configured to transmit the ultraviolet light and the cooling air, and a lamp reflector configured to reflect the ultraviolet light from the lamp bulb toward the lamp face;

an ultraviolet (UV) transmissive member positioned above said lamp face and below said interior space to define a plenum between said lamp face and said UV transmissive member, said UV transmissive member configured to transmit the ultraviolet light into said interior space and configured to divert the cooling air from entering said interior space;

a first reflector positioned in said plenum and below said UV transmissive member, said first reflector positioned to reflect the ultraviolet light toward said interior space;

a second reflector positioned in said chamber and above said UV transmissive member, said second reflector positioned to reflect the ultraviolet light toward interior space; and an exhaust system coupled in fluid communication with said plenum, said exhaust system configured to exhaust the cooling air from said plenum.

2. The apparatus of claim 1, further comprising:

a third reflector positioned in said chamber and above said UV transmissive member, said third reflector positioned to reflect the ultraviolet light toward said interior space.

3. The apparatus of claim 2 wherein said chamber includes a first wall and a second wall indirectly connected with said first wall, said first reflector is attached to said first wall, and said third reflector is attached to said second wall.

4. The apparatus of claim 1, further comprising:

a third reflector positioned in said plenum and below said UV transmissive member, said third reflector positioned to reflect the ultraviolet light toward said interior space, and said UV transmissive member positioned between said second reflector and said third reflector.

5. The apparatus of claim 1, further comprising:

a third reflector positioned in said plenum and below said UV transmissive member, said third reflector positioned to reflect the ultraviolet light toward said interior space.

6. The apparatus of claim 1, further comprising:

a light shroud coupled to said interior space of said chamber and configured for introducing an object into said interior space that carries a material to be cured by the ultraviolet light.

7. A method for operating an ultraviolet light source having an air-cooled lamp head, the method comprising:

emitting ultraviolet light from a lamp bulb inside the lamp head;

reflecting the ultraviolet light from the lamp bulb toward a lamp face of the lamp head;

cooling the lamp head with a flow of cooling air;

transmitting the ultraviolet light from the lamp face through an ultraviolet (UV) transmissive member and into an interior space of a chamber located above the UV transmissive member, said UV transmissive member positioned above said lamp face and below said interior space to define a plenum between said lamp face and said UV transmissive member;

reflecting the ultraviolet light toward said interior space with a first reflector positioned below said UV transmissive member and a second reflector positioned in chamber above said UV transmissive member; and diverting the flow of cooling air away from the interior space of the chamber.

8. The method of claim 7, further comprising:

reflecting the ultraviolet light toward the interior space with a third reflector positioned in the chamber and above the UV transmissive member.

9. The method of claim 7, further comprising:

reflecting the ultraviolet light toward the interior space with a third reflector positioned below the UV transmissive member.

10. The method of claim 7, further comprising:

directing the flow of cooling air emitted from the lamp face of the lamp head toward the interior space of the chamber for diversion by the UV transmissive member away from the interior space of the chamber.

11. The apparatus of claim 2, further comprising:

a fourth reflector positioned in said interior space of said chamber and above said UV transmissive member, said fourth reflector positioned to reflect the ultraviolet light back toward said lamp head.

12. The method of claim 9, further comprising:

reflecting the ultraviolet light back toward the lamp head with a fourth reflector positioned in the interior space of the chamber and above the UV transmissive member.

* * * * *